Oct. 23, 1962 F. X. FOERCH 3,060,366
FREQUENCY CONTROL SYSTEM
Filed Oct. 30, 1958
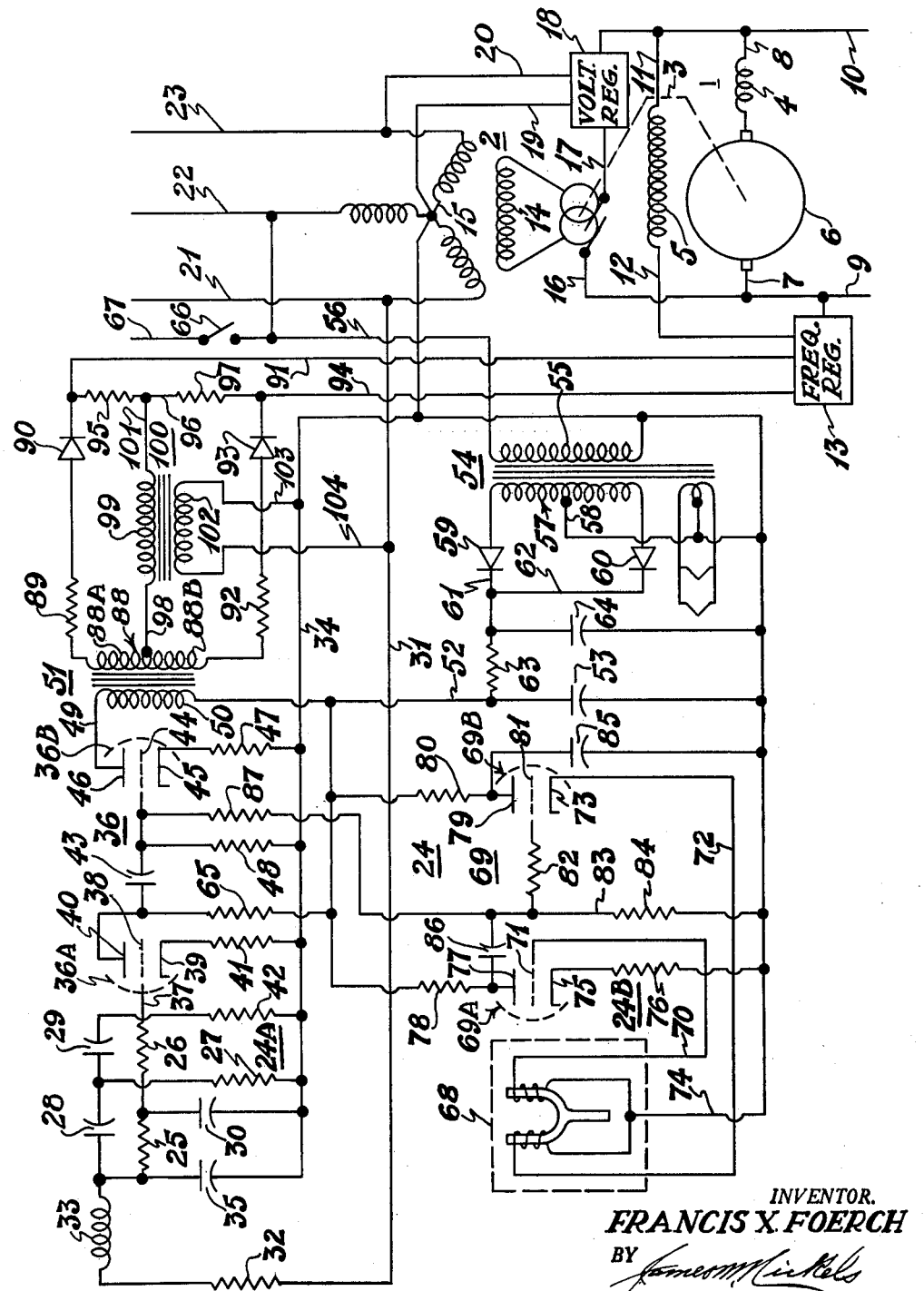
INVENTOR.
FRANCIS X. FOERCH
BY
ATTORNEY

United States Patent Office 3,060,366
Patented Oct. 23, 1962

3,060,366
FREQUENCY CONTROL SYSTEM
Francis X. Foerch, Lakewood, N.J., assignor to The Bendix Corporation, a corporation of Delaware
Filed Oct. 30, 1958, Ser. No. 770,834
6 Claims. (Cl. 322—32)

The present invention relates to frequency control systems and more particularly to frequency control systems having extremely accurate control.

In many applications frequency is the basis of control for instruments, hence, it is extremely important that the frequency be maintained within close limits from a predetermined value. Existing frequency control systems are inadequate to maintain the close limits required and have too long a response time.

The present invention provides a frequency control system which uses frequency deviation for a coarse control and phase comparison for a fine control. This system will provide a signal needed to compensate for load changes without allowing any frequency change. In other words, it provides a zero-error frequency control.

It is an object of the invention to provide an improved frequency control system.

Another object of the invention is to provide an improved frequency detector.

Another object of the invention is to provide an improved system for controlling the output of an inverter.

Another object of the invention is to provide a novel frequency control system which will provide an error signal for changes in load without a change in frequency.

Another object of the invention is to provide an accurate frequency control system.

The above and other objects and features of the invention will appear more fully hereinafter from a consideration of the following description taken in connection with the accompanying drawing wherein one embodiment is illustrated by way of example.

In the drawing the single FIGURE is a schematic diagram of an inverter embodying the invention.

Referring now to the drawing, a motor 1 is illustrated as driving a generator 2 through a shaft 3. The motor 1 may be of the type having a series winding 4, shunt winding 5 and armature 6. The winding 4 is connected in series with the armature 6 by conductors 7 and 8 across input lines 9 and 10. The input lines 9 and 10 are connected to a suitable source of electrical energy (not shown). One end of the winding 5 is connected by a conductor 11 to the input line 10, and the other end of the winding 5 is connected by conductor 12 to the output of a frequency regulator 13, the function of which will be explained later.

The generator 2 is illustrated as having a rotating field winding 14 and a three phase stator or output winding 15. While the generator 2 is illustrated as being three phase, it is understood that it could be single phase or any other multiple phase as well. One end of the winding 14 is connected by conductor 16 and conventional slip rings to the conductor 9. The other end of the winding 14 is connected by conductor 17 and voltage regulator 18 to the conductor 10. The voltage regulator 18 may be any of the conventional types and is connected by conductors 19 and 20 to be responsive to the output voltage of the generator 3. The three phase output winding 15 is connected to output conductors 21, 22 and 23 which are adapted to be connected to a suitable load (not shown).

A novel feature of the invention is the means for providing an error signal for the frequency regulator. A frequency detector is indicated generally by the numeral 24 and comprises two sections, a primary section 24A, which gives course frequency control and a secondary section 24B which gives fine frequency control. In the primary section 24A, a parallel-T frequency sensing network, comprising resistors 25, 26 and 27 and capacitors 28, 29 and 30, has one side thereof connected to output line 21 by conductor 31, resistor 32 and inductance 33. The other side of the network is connected by conductor 34 to the neutral of the generator 2. A capacitor 35 is connected across the input to the network and together with the resistor 32 and inductance 33 form an input filter and provide a 90° phase shift.

The output of the parallel-T network is amplified by a two-stage amplifier illustrated as a dual triode 36. It is understood, however, that any other type of suitable amplifier could be used. The output of the parallel-T network is connected by conductor 37 to grid 38 of a section 36A of the triode 36. In addition to the grid 38, the section 36A has a cathode 39 and anode 40. The cathode 39 is connected by a resistor 41 to the neutral conductor 34. A grid resistor 42 is connected between the grid 38 and neutral conductor 34.

The anode 40 of the section 36A is connected by a capacitor 43 to grid 44 of section 36B of the device 36. In addition to the grid 44, the section 36B of the device 36 has a cathode 45 and anode 46. The cathode 45 is connected by a resistor 47 to the neutral conductor 34. A grid resistor 48 is connected between the grid 44 and conductor 34. The anode 46 is connected by conductor 49 to one side of a primary winding 50 of a transformer 51. The other side of the winding 50 is connected by a conductor 52 and capacitor 53 to the neutral conductor 34.

B+ is supplied to the anodes 40 and 46 of the device 36 by means of a transformer 54. The transformer 54 has a primary winding 55, one side of which is connected by conductor 56 to the output line 22. The other side of the winding 55 is connected to the neutral conductor 34. A secondary winding 57 of the transformer 54 has a center tap 58 connected to the neutral conductor 34 and the ends of the winding 57 are connected by rectifiers 59 and 60, conductors 61 and 62 and resistor 63 to the conductor 52. A capacitor 64 may be connected between the conductor 61 and the neutral conductor 34. The anode 40 is connected to the conductor 52 by a resistor 65 while the anode 46 is connected to the conductor 52 by means of the winding 50. Provisions may be made to energize the transformer 54 from an auxiliary source of energy (not shown) by means of a switch 66 and conductor 67. This will provide energy for stand-by and warm-up.

The secondary section 24B includes a tuning fork 68 controlling the frequency of a vacuum tube oscillator 69. While a vacuum tube oscillator has been illustrated, it is understood that other types of oscillators may be used. The tuning fork 68 has one terminal connected by conductor 70 to a grid 71 of a section 69A of the oscillator 69. The other side of the tuning fork 68 is connected by conductor 72 to a cathode 73 of a section 69B of the oscillator 69. The grounded or center terminal of the tuning fork 68 is connected by conductor 74 to the neutral conductor 34. In addition to the grid 71, the section 69A has a cathode 75 connected by resistor 76 to neutral conductor 34 and an anode 77 connected by a resistor 78 to the conductor 52. The section 69B has an anode 79 connected by resistor 80 to the conductor 52 and a grid 81 connected by a resistor 82, conductor 83 and register 84 to neutral conductor 34. A capacitor 85 is connected between the anode 79 and conductor 34. The anode 77 is connected by capacitor 86, conductor 83 and resistor 87 to the grid 44 of the device 36.

The transformer 51 has a center tapped secondary 88 having sections 88A and 88B. The section 88A is connected by resistor 89, rectifier 90 and conductor 91 to one input of the frequency regulator 13 and the section 88B is connected by resistor 92, rectifier 93 and conductor 94 to the other input of the frequency regulator 13. A resistor 95, conductor 96 and resistor 97 are connected between the conductors 91 and 94. The center tap of the transformer secondary 88 is connected by conductor 98 to one end of the secondary winding 99 of a transformer 100 while the other end of the winding 99 is connected by conductor 101 to the conductor 96. The transformer 100 has a primary winding 102 having one side thereof connected by conductor 104 to the conductor 31 and the other side thereof connected by conductor 103 to the neutral conductor 34.

In the operation, the primary section provides coarse frequency control and is active only upon starting. Upon the frequency reaching a predetermined value, the secondary section takes over and provides a zero-error frequency control.

The parallel-T network is designed to provide a null output when the input signal is of a predetermined frequency, and an increasing error signal as the frequency deviates above or below this predetermined value. In order to reduce harmonics to a practical level and to provide a 90° phase shift, the input signal is fed through the input filter. The error signal is an A.-C. voltage of the same frequency as the input to the network with an amplitude proportional to the amount of deviation from the predetermined frequency and a phase relationship of either 90° leading or lagging with respect to the input of the network, depending upon whether the derivation is above or below the predetermined frequency. The output of the network is amplified and then transformer-coupled into a phase discriminator.

For a better understanding of the invention, an examination of its operation for three different conditions will be made, assuming that the predetermined frequency is 400 cycles. First, at 400 cycles, the parallel-T network is putting out a null signal, hence there will be no voltage induced in the secondary 88 of the transformer 51. The voltage in the secondary 99 of the transformer 100 is then rectified by both rectifiers 90 and 93, so that there will be equal D.-C. voltages across resistors 95 and 96. Since the output signal is the difference between the voltages across resistors 95 and 96, the D.-C. output will be zero when the input frequency is 400 cycles.

In the second condition, where the output of the system is above 400 cycles, the parallel-T network is putting out a signal with a 90° phase lead with respect to the network input which has been modified by a 90° phase lead by the input filter. Hence, the amplifier receives an error signal which is 90°+90° or 180° leading with respect to the inverter output. For purposes of illustration, it is assumed that the amount of frequency deviation is sufficient to produce 10 volts A.-C. across each half of the secondary 88 of the transformer 51 which results in two equal voltages 180° out of phase with each other. Thus, resistor 95 sees a rectified total of 20 volts from the secondary 99 of the transformer 100 and 10 volts from the section 88A of the transformer 51. These two voltages are in phase and are producing a voltage across resistor 95 which is 50% higher than that at 400 cycles. At the same time, resistor 96 sees the total of 20 volts from the secondary 99 of the transformer 100 and 10 volts from the section 88B of the transformer, however, the voltage from the section 88B is 180° out of phase with the voltage from the secondary 99, therefore, these voltages subtract and the voltage across resistor 96 is 50% lower than for 400 cycles. This provides a large difference between the D.-C. voltages across resistors 95 and 96, resulting in a large D.-C. error signal from the conductors 91 and 94 to the frequency control unit with the conductor 91 being positive.

In the third condition, when the inverter output is below 400 cycles, the parallel-T network puts out a signal which lags the input by 90°. This 90° lag added to the filters 90° lead produces an error signal that is in phase with the inverter output. Assuming that the deviation is sufficient to produce 10 volts across each half of the secondary 88 of the transformer 51, the voltage across the section 88A is out of phase with the voltage of the secondary 99 of the transformer 100, hence they will subtract. Resistor 95 sees a voltage that is 50% lower than at 400 cycles. At the same time, the voltage across the section 88B is in phase with the voltage of the secondary 99. Therefore, they add and resistor 96 sees a voltage that is 50% above that at 400 cycles. Again, this provides a large D.-C. error signal to the frequency regulator through conductors 91 and 94 except that conductor 94 is positive.

The aforenoted describes a frequency detector capable of controlling the speed of an inverter, however, it would be necessary to have some frequency shift to compensate for changing conditions, such for example as changing load. In order to eliminate this deviation and produce a zero-error frequency control system, the output of the frequency standard, illustrated as a tuning fork oscillator, is injected into the amplifier. This does not affect the system operation until the primary section has brought the frequency to substantially the predetermined frequency, illustrated as 400 cycles. In this range the output of the parallel-T network is near enough to null that the signal from the frequency reference becomes effective. The output of the phase discriminator will now vary with the instantaneous phase relationship between the frequency standard and the inverter output. Thus, the inverter output will be locked in a given phase relationship with the frequency reference and as long as the phase relationship remains fixed there will be no frequency error.

Allowing this phase relationship to change will provide the necessary error signal to compensate for load changes without permitting any frequency change. The frequency standard phase detector combination has a dynamic range from 0° to 180° leading. Vectorial addition shows that the phase detector will have maximum output in one polarity when the frequency standard is in phase with the inverter output, maximum output in the other polarity when the frequency standard is 180° out of phase with the inverter output and zero output when there is 90° between the two.

The frequency regulator 13 may be a magnetic amplifier, carbon pile or any other suitable means for controlling the energization of the shunt field winding 5 in accordance with the error signal from the frequency discriminator.

Although only one embodiment of the invention has been illustrated and described, various changes in the form and relative arrangements of the parts, which will now appear to those skilled in the art, may be made without departing from the scope of the invention.

What is claimed is:

1. A frequency control system for an inverter having a D.-C. motor driving an A.-C. generator, comprising a coarse control and a fine control, said coarse control having a frequency sensing network to provide a signal of a phase and amplitude in accordance with a deviation of said generator output frequency from a predetermined value, said fine control having a frequency standard to provide a singal at said predetermined frequency and a fixed phase, means to provide a signal of a phase and frequency as the output of said generator, means for adding said signals vectorially to provide an error signal, and means responsive to said error signal to control said motor to maintain the output frequency of said generator at said predetermined value.

2. A frequency control system for an A.-C. generator driven by a variable speed power source having means for controlling the speed thereof, comprising a frequency sensing network for providing a signal of a phase and magnitude in accordance with the deviation of the output frequency of said generator from a predetermined value and of the same frequency as said output frequency, phase shifting means connecting said frequency sensing network to the output of said generator, means including a phase discriminator for producing an error signal in accordance with the phase relationship of said first signal with the phase of said generator output, and means connecting said error signal to actuate said controlling means to maintain the speed of said driving means whereby said output frequency maintains said predetermined value.

3. The combination as set forth in claim 2 and including a frequency standard for producing a signal of said predetermined frequency, and means including said phase discriminator for producing an error signal in accordance with the phase difference between said frequency standard signal and the phase of said generator output.

4. A frequency control system for an A.-C. generator driven by a D.-C. motor having a control winding therefor, comprising means responsive to deviation of the output frequency of said generator from a predetermined value to energize said control winding to return said output frequency to said predetermined value, and other means including a frequency standard for producing a control signal in accordance with the phase difference between said frequency standard and said generator output thereby providing a zero-error frequency control.

5. The combination as set forth in claim 4 in which said frequency standard is a tuning fork controlled oscillator.

6. A frequency control system for an A.-C. generator driven from a variable speed power source, comprising a parallel-T frequency sensing network, phase shifting means connecting said network to the output of said generator, an oscillator adapted to have an output of a predetermined frequency, a phase discriminator, transformer means connecting the output of said frequency sensing network and said oscillator to said phase discriminator, second transformer means connecting the output of said generator to said phase discriminator, and means responsive to the phase differences between said network and oscillator and the output of said generator to control said variable speed power source to maintain the output of said generator at said predetermined frequency.

References Cited in the file of this patent

UNITED STATES PATENTS

| | | |
|---|---|---|
| 2,622,236 | White | Dec. 16, 1952 |
| 2,798,997 | Curtis | July 9, 1957 |
| 2,920,263 | Curtis | Jan. 5, 1960 |